United States Patent [19]
Abels et al.

[11] Patent Number: 5,960,903
[45] Date of Patent: Oct. 5, 1999

[54] DRIVER RESTRAINT DEVICE FOR AN INDUSTRIAL TRUCK

[75] Inventors: Theodor Abels, Aschaffenburg; Hermann Meiller, Wernberg; Josef Kohl, Hirschau, all of Germany

[73] Assignee: Linde Aktiengesellschaft, Germany

[21] Appl. No.: 09/066,026

[22] Filed: Apr. 24, 1998

[30] Foreign Application Priority Data

Apr. 25, 1997 [DE] Germany .................. 197 17 622

[51] Int. Cl.⁶ .................. B60K 26/00; B60R 22/00
[52] U.S. Cl. .................. 180/315; 280/801.1
[58] Field of Search .................. 180/272, 268, 180/269, 270, 907, 908, 315; 280/801.1; 297/468, 475, 483, 487

[56] References Cited

U.S. PATENT DOCUMENTS

| | | | |
|---|---|---|---|
| 3,191,993 | 6/1965 | Parks | 297/388 |
| 3,840,849 | 10/1974 | Lohr | 180/270 |
| 3,883,843 | 5/1975 | Telmet et al. | 180/270 |
| 3,902,074 | 8/1975 | Uota | 180/270 |
| 4,431,233 | 2/1984 | Ernst | 297/468 |
| 4,469,351 | 9/1984 | Matsuoka | 280/806 |
| 4,537,446 | 8/1985 | Roney et al. | 297/464 |
| 4,785,906 | 11/1988 | Kang | 180/270 |
| 4,856,612 | 8/1989 | Clevenger, Jr. et al. | 180/273 |
| 4,986,387 | 1/1991 | Thompson et al. | 180/212 |
| 5,253,924 | 10/1993 | Glance | 297/452.1 |

*Primary Examiner*—Lanna Mai
*Assistant Examiner*—Faye M. Fleming
*Attorney, Agent, or Firm*—Webb Ziesenheim Logsdon Orkin & Hanson, P.C.

[57] ABSTRACT

A driver restraint device is provided for an industrial truck which has a driver's seat. The driver restraint device has a belt (4) and a belt buckle (8). A closing latch (5) which is connected to the belt (4) can be fastened to the belt buckle (8). The belt (4) can be automatically retracted by means of a retractor (9), whereby when the belt (4) is retracted, the closing latch (5) is in a defined inoperative position. The belt (4) is fastened to a mounting device which is connected to the driver's seat so that when the closing latch (5) is in the defined inoperative position, it is located in front of a vertical transverse plane (12) which divides the seat surface (1) of the driver's seat in the middle. In an additional embodiment of the invention, the belt buckle (8) is fastened to a mounting device which is connected to the driver's seat so that the belt buckle (8) is located in front of a vertical transverse plane (12) which divides the seat surface (1) of the driver's seat in the middle. In one configuration of the invention, the closing latch (5) in the defined inoperative position is at some distance above the horizontal plane defined by a seat surface (1) of the driver's seat.

16 Claims, 2 Drawing Sheets

DRIVER RESTRAINT DEVICE FOR AN INDUSTRIAL TRUCK

BACKGROUND OF THE INVENTION

This invention relates generally to the field of industrial trucks and, more particularly, to a driver restraint device for an industrial truck having a driver's seat. The driver restraint device preferably has a belt and a buckle with a closing latch connected to the belt. The closing latch can be attached to the buckle. The belt can be automatically retracted by means of a retractor such that when the belt is retracted, the closing latch is in a defined inoperative position.

Driver restraint devices of the prior art are used on industrial trucks and on other vehicles. FIG. 1 of the drawings shows one example of a conventional industrial truck 20 having a lifting device 22 in the form of a pair of forks and a driver's compartment 24. A seat 26 and a control console 28 with control elements 30 for controlling the operation of truck 20 and/or the lifting device 22 are located in the driver's compartment 24. The seat 26 typically has a conventional automobile-type seat belt device having a belt with a latch wound around a spring biased retractor located on one side of the seat 26 and a buckle located on the other side of the seat 26. Operation of such conventional seat belt systems is well known to one of ordinary skill in the art. The unused portion of the belt is typically rolled up on the retractor. A driver seated in the driver's seat can unroll the belt from the retractor by grasping the latch and pulling. The driver places the belt around his body and then attaches the belt to the buckle by inserting the closing latch into the buckle slot. Tension exerted on the belt by the retractor ensures that the belt remains in contact with the driver's body at all times.

On driver restraint devices of the prior art, the inoperative positions of the closing latch and of the buckle, i.e. the non-connected position of the closing latch and buckle, are in the vicinity of the transition from the seat surface of the driver's seat into the backrest. This location requires the driver to assume an unnatural bodily position to attach the belt to the buckle since the driver must typically reach behind him to grab the closing latch and then try to insert the latch into the buckle, which is also typically located behind the driver on the opposite side of the seat. It is also necessary for the driver to look at the closing latch and/or the buckle during this operation since the latch, typically a flat plate, must be inserted into a thin slot in the buckle, with the slot being not much larger than the latch.

In practice, conventional driver restraint devices of the type described above on industrial trucks are frequently left unattached by the drivers because the manual operations and movements required to attach the belt are time-consuming, uncomfortable and physically tiring. This is a safety hazard since, should the driver be involved in an accident while not wearing the seat belt, the driver could be thrown from the driver's compartment and injured.

The object of this invention is to provide a driver restraint device which can be comfortably operated by a driver on an industrial truck and which provides that the attachment and release of the safety belt can be performed in a manner which is ergonomically advantageous.

SUMMARY OF THE INVENTION

The invention teaches that this object can be accomplished if the belt is fastened to a mounting device which is connected to the driver's seat so that the closing latch, in the defined inoperative, i.e. the open or retracted position, is located in front of a vertical transverse plane which divides the seat surface of the driver's seat substantially in the middle.

An additional solution claimed by the invention is that the buckle may be fastened to a mounting device which is connected to the driver's seat so that the buckle, when it is in the defined inoperative, i.e. non-connected position, is located in front of the vertical transverse plane which divides the seat surface of the driver's seat substantially in the middle.

In both of the solutions claimed by the invention, the closing latch and/or the buckle, when they are in their respective inoperative positions, may be located at the front portion of the seat surface of the driver's seat, i.e. forward of the vertical transverse plane. As a result of the location of the closing latch at the front portion of the driver's seat, access to the closing latch is improved and the closing latch is moved into the driver's field of view. No particular effort is therefore required of the driver to attach the belt to the buckle. Similar advantages result from the location of the buckle claimed by the invention at the front portion of the driver's seat.

In one advantageous refinement of the invention, the closing latch, when in the defined inoperative position, is spaced from and located above a substantially horizontal plane defined by the seat surface of the driver's seat.

An analogous advantageous refinement of the invention is that the belt buckle may be spaced from and located above the substantially horizontal plane defined by a seat surface of the driver's seat.

The closing latch and the buckle, in their respective inoperative positions, may both be located above and spaced from the top of the seat surface. The closing latch or the buckle are therefore easily accessible and are located in the field of view of a driver seated on the driver's seat. All that is necessary to attach the belt is to move the closing latch in only one, essentially linear direction. For example, it is advantageous if the closing latch or the buckle is at a distance of between about 10 cm and 25 cm from the top of the seat surface.

In one advantageous refinement of the invention, the mounting device is configured in the form of an armrest. The retractor and the buckle may be integrated into the armrest or may be fastened to it.

It is particularly advantageous to locate vehicle or lifting device control elements and/or display elements on the mounting device. The control elements may control movement of the vehicle or lifting device and the display elements may show the status of various aspects of the vehicle or lifting device, such as speed. When the mounting device is configured as an armrest attached to the seat and spaced from the top of the seat surface, an additional advantage is that the control elements and/or display elements are easily accessible and visible and are located in the driver's field of view.

In one appropriate embodiment of the invention, an inclination sensor and/or an acceleration sensor is/are provided and is/are electronically connected to a device which locks the belt. The above mentioned sensors and the device which locks the belt can correspond to conventional systems which are known and used on conventional automatic belts.

In an additional advantageous configuration, the belt buckle has a receptacle opening for the latch tongue of the closing latch. The receptacle opening is preferably tapered or funnel-shaped, i.e. having a wide opening and tapered sides. The funnel-shaped receptacle opening facilitates the insertion of the latch tongue so that the belt can be buckled without looking.

It is particularly appropriate if the belt is realized in the form of a lap belt. At the speeds which can be reached by an industrial truck, a lap belt is sufficient to keep the driver in the driver's seat in the event of a head-on collision. If the industrial truck tips over, the lap belt also prevents the driver from falling out of the driver's cab.

In one advantageous refinement of the invention, the buckle can be electronically connected to a signal transmitter which detects the engagement of the closing latch with the buckle. The signal transmitter can therefore detect whether the driver restraint device is attached or unattached.

It is also appropriate if the signal transmitter is electronically connected to a control system for the propulsion system of the industrial truck. This connection can be in the form of a circuit, for example, which ensures that the industrial truck can only be started if the driver restraint device is active, i.e. the closing latch is engaged with the buckle.

Additional advantages and configurations of the invention are explained in greater detail below with reference to the embodiments illustrated in the accompanying schematic figures. A complete understanding of the invention will be obtained from the following description when taken in connection with the accompanying drawing figures wherein like reference characters identify like parts throughout.

DESCRIPTION OF THE PREFERRED EMBODIMENTS

Figure 1:
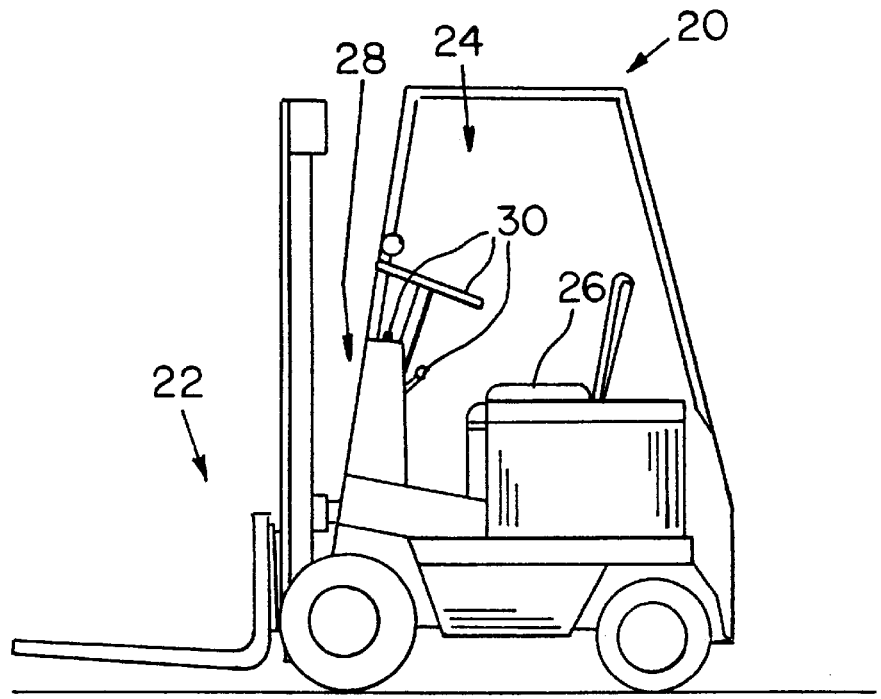
FIG. 1 is a schematic plan view of a conventional industrial truck.

For purposes of the description hereinafter, the terms "upper," "lower," "right," "left," "vertical,""horizontal," "top," "bottom" and derivatives or equivalents thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments of the invention. Hence, specific dimensions and other physical characteristics related to the embodiments disclosed herein are not to be considered as limiting.

Figure 2:
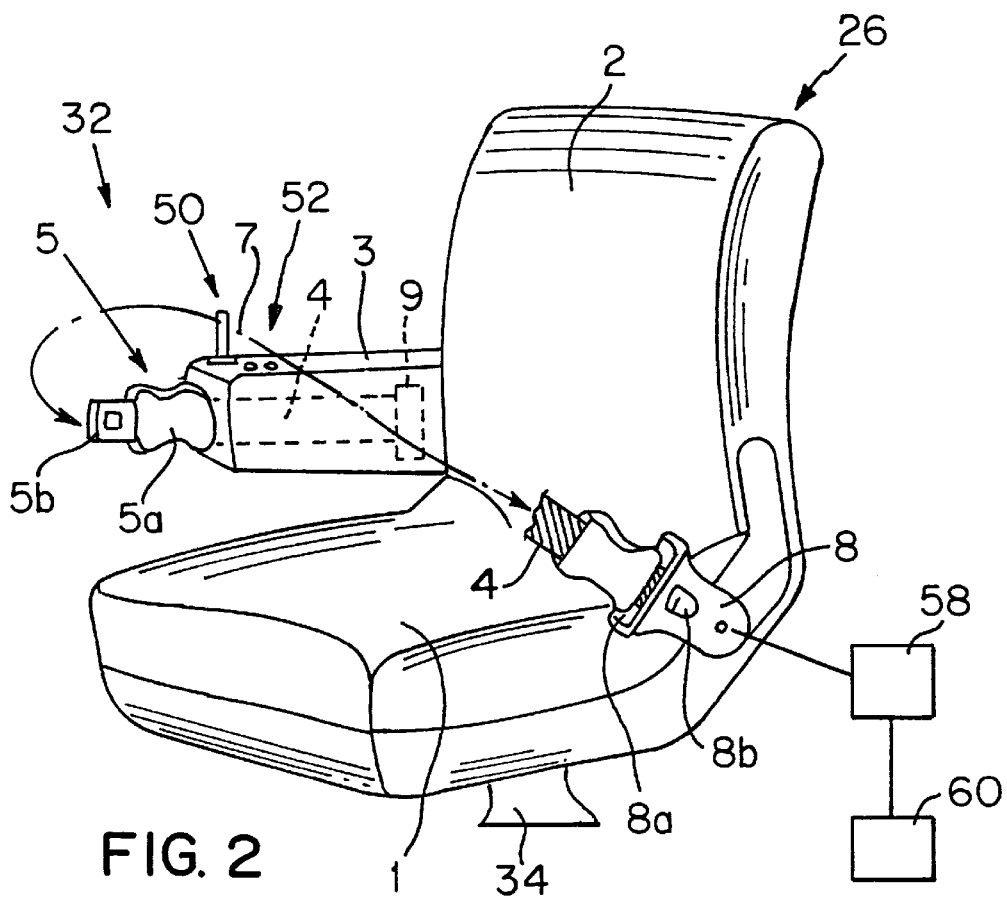
FIG. 2 shows a driver's seat with the driver restraint device claimed by the invention.

FIG. 2 shows a driver's seat 26 having a driver restraint device 32 of the invention. The driver's seat 26 is located in the driver's compartment of an industrial vehicle, for example by being attached to a pedestal mount 34 attached to the floor of the driver's compartment. Alternatively, the driver's seat 26 can be mounted to a wall in the driver's compartment or mounted in the driver's compartment in any conventional manner. The driver's seat 26 has a substantially horizontal seat surface 1 and a substantially vertical backrest 2. An armrest 3 is preferably non-detachably connected to the driver's seat 26 and extends substantially perpendicularly from the backrest 2 at one side of the seat 26. The armrest 3 functions as a mounting device for at least one portion of the driver restraint device 32. For example, a conventional belt retractor 9 may be integrated into the armrest 3 and configured to hold a belt 4 which may be wound around the retractor 9 such that the belt 4 is extensible and retractable. Connected to one end of the belt 4 is a closing latch 5 having a handle 5a and a latch tongue 5b extending from the handle 5a. The retractor 9 may be a conventional spring biased retractor configured to bias the belt 4 onto the retractor 9 to bias the handle 5a against the outer end of the armrest 3. Therefore, the closing latch 5, in its defined inoperative, i.e. open, position is in contact against the end of the armrest 3 and is thus located above the top of the seat surface 1 and in the area of the front half of the seat surface 1, i.e. the closing latch 5 lies forward of a vertical transverse plane which divides the seat surface 1 substantially in half, as will be further explained below with respect to FIG. 3 of the drawings. As a result of this location, the closing latch 5 is ergonomically and advantageously accessible to a driver seated in the driver's seat 26. The armrest 3 is preferably mounted so that the closing latch 5, in the inoperative position, is located between about 10 cm–25 cm from the top of the seat surface 1.

A buckle 8 is located on the side of the seat 26 opposite the armrest 3. The buckle 8 may be mounted on the seat 26 or may be attached to the floor or side of the driver's compartment either directly or by a small length of belt material. The buckle 8 preferably has a tapered or funnel-shaped opening 8a to receive the latch tongue 5b. A switch 8b, such as a conventional seat belt release mechanism, is mounted on the buckle 8.

The left side of FIG. 2 shows the closing latch 5 in the inoperative position. To latch the restraint device 32, the closing latch 5 is moved in the direction of arrow 7 toward the buckle 8 which is located on the other side of the driver's seat 26. The right side of FIG. 2 shows the closing latch 5 engaged with the buckle 8. When the latch tongue 5b is inserted into the funnel-shaped receptacle opening 8a of the buckle 8 and is locked in place, the driver restraint device is thereby active, i.e. closed. To release the latch tongue 5b from the buckle 8, the switch 8b located on the buckle 8 is actuated to disengage the latch tongue 5b from the buckle 8. The belt 4 is then automatically retracted into the armrest 3 by the spring force exerted by the retractor 9.

Figure 3:
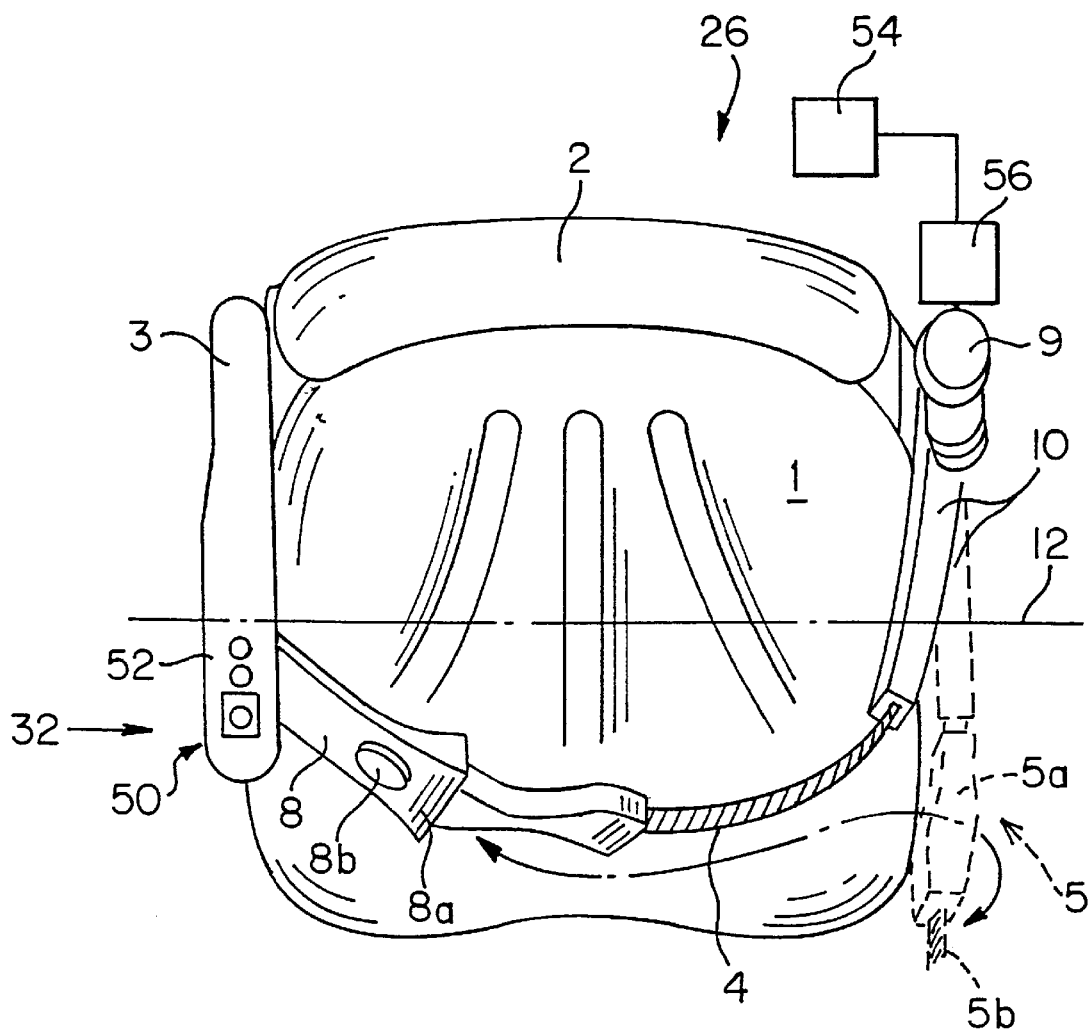
FIG. 3 shows a driver's seat with an additional embodiment of a driver restraint device as claimed by the invention.

FIG. 3 shows an overhead view of a driver's seat 26, with an additional embodiment of the driver restraint device 32 of the invention. In this embodiment, the buckle 8 is fastened to the armrest 3. The buckle 8 may be attached to the end of the armrest or preferably, as shown in FIG. 3 of the drawings, attached to an inner side of the armrest 3 on a forward position of the armrest 3. The retractor 9 is fastened in conventional manner in the vicinity of the transition from the seat surface 1 to the backrest 2 on the opposite side of the seat 26. Connected to the retractor 9 is a partly elastic retaining device 10 which defines the inoperative position of the closing latch 5, shown in dashed lines in FIG. 3. The retaining device 10 may be, for example, plastic and the belt 4 is slidable through the retaining device 10. The operative, i.e. connected, position of the restraint device 32 is shown in solid lines in FIG. 3.

The buckle 8, as well as the closing latch 5 when the latter is in its inoperative position, are thereby both located in front of a transverse plane 12 which divides the seat surface 1 of the driver's seat 26 substantially in the middle. The buckle 8 is therefore at a spaced vertical distance from the top of seat surface 1, for example, about 10–25 cm.

As shown in FIGS. 2 and 3, vehicle or lifting device control elements 50 for controlling the operation of the vehicle and/or lifting device and display elements 52 for showing the status of selected vehicle or lifting device systems may be located on the armrest 3. As shown in FIG. 3, a sensor 54, such as an inclination sensor or an acceleration sensor, may be located on the vehicle and electronically connected to a conventional locking device 56 which locks the belt in emergency situations, such as tipping of the vehicle. As shown in FIG. 2, the buckle 8 may be electronically connected to a signal transmitter 58 which detects the engagement of the closing latch 5 with the buckle 8. The signal transmitter 58 may be electronically connected to the vehicle propulsion system 60 such that the track can only be started if the driver restraint device 32 is active, i.e. the closing latch 5 is engaged with the buckle 8.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrated only and are not limiting to the scope of the invention which is to be given the full breadth of the appended claims and any and all equivalents thereof.

I claim:

1. A driver restraint device for an industrial truck having a driver's seat with a seat surface, the driver restraint device comprising:

a belt;

a closing latch connected to the belt;

a belt buckle, wherein the closing latch is configured to engage the belt buckle;

a retractor, wherein the belt is automatically retractable by the retractor such that when the belt is retracted, the closing latch is in a defined inoperative position;

a mounting device connected to the driver's seat, wherein the belt is fastened to the mounting device so that the closing latch, when in the defined inoperative position, is located in front of a vertical transverse plane which divides the seat surface of the driver's seat substantially in half and wherein the mounting device is an armrest; and at least one of control elements for controlling operation of the truck and display elements for displaying the status of at least one truck operating system located on the mounting device.

2. A driver restraint device for an industrial truck having a driver's seat with a seat surface, the driver restraint device comprising:

a belt;

a closing latch connected to the belt;

a belt buckle, wherein the closing latch is configured to engage the belt buckle;

a retractor, wherein the belt is automatically retractable by the retractor, such that when the belt is retracted, the closing latch is in a defined inoperative position;

a mounting device connected to the driver's seat, wherein the belt buckle is fastened to the mounting device so that the belt buckle is located in front of a vertical transverse plane which divides the seat surface of the driver's seat substantially in half and wherein the mounting device is an armrest; and at least one of control elements for controlling operation of the truck and display elements for displaying the status of at least one truck operating system located on the mounting device.

3. A driver restraint device as claimed in claim 1, wherein the closing latch, when in the defined inoperative position, is spaced from and located above the seat surface of the driver's seat.

4. A driver restraint device as claimed in claim 2, wherein the closing latch, when in the defined inoperative position, is spaced from and located above the seat surface of the driver's seat.

5. A driver restraint device as claimed in claim 1, wherein the belt buckle is spaced from and located above the seat surface of the driver's seat.

6. A driver restraint device as claimed in claim 2, wherein the belt buckle is spaced from and located above the seat surface of the driver's seat.

7. A driver restraint device as claimed in claim 1, including an inclination sensor or an acceleration sensor connected to a locking device which locks the belt.

8. A driver restraint device as claimed in claim 2, including an inclination sensor or an acceleration sensor connected to a locking device which locks the belt.

9. A driver restraint device as claimed in claim 1, wherein the belt buckle has a receptacle opening for receiving a latch tongue of the closing latch and the receptacle opening is substantially funnel-shaped.

10. A driver restraint device as claimed in claim 2, wherein the belt buckle has a receptacle opening for receiving a latch tongue of the closing latch and the receptacle opening is substantially funnel-shaped.

11. A driver restraint device as claimed in claim 1, wherein the belt is a lap belt.

12. A driver restraint device as claimed in claim 2, wherein the belt is a lap belt.

13. A driver restraint device as claimed in claim 1, including a signal transmitter, wherein the signal transmitter detects the connection of the belt buckle with the closing latch.

14. A driver restraint device as claimed in claim 2, including a signal transmitter, wherein the signal transmitter detects the connection of the belt buckle with the closing latch.

15. A driver restraint device as claimed in claim 13, wherein the signal transmitter is connected to a control system for the propulsion system of the industrial truck.

16. A driver restraint device as claimed in claim 14, wherein the signal transmitter is connected to a control system for the propulsion system of the industrial truck.

* * * * *